United States Patent [19]
Kulakowski et al.

[11] Patent Number: 5,132,954
[45] Date of Patent: Jul. 21, 1992

[54] CONTROLS FOR OPTICAL DISK RELATING TO ACCESSING AND UTILIZATION OF SUCH DISK

[75] Inventors: John E. Kulakowski; Rodney J. Means; Morovat Tayefeh, all of Tucson, Ariz.

[73] Assignee: International Business Machines Corporation, Armonk, N.Y.

[21] Appl. No.: 586,919

[22] Filed: Sep. 24, 1990

[51] Int. Cl.$^5$ .............................................. G11B 7/00
[52] U.S. Cl. ................................... 369/48; 369/32; 369/58; 369/275.3
[58] Field of Search ................ 369/48, 58, 32, 44.32, 369/56, 13, 275.3, 54

[56] References Cited

U.S. PATENT DOCUMENTS

| | | | |
|---|---|---|---|
| 4,498,146 | 2/1985 | Martinez | 369/58 |
| 4,821,254 | 4/1989 | Satoh et al. | 369/32 |
| 4,958,314 | 9/1990 | Imai et al. | 369/32 |

FOREIGN PATENT DOCUMENTS

| | | |
|---|---|---|
| 0232134 | 1/1987 | European Pat. Off. |
| 0280548 | 8/1988 | European Pat. Off. |
| 0294241 | 12/1988 | European Pat. Off. |
| 0425125 | 5/1991 | European Pat. Off. |

OTHER PUBLICATIONS

IBM Publication GA26-1661-8, Jan. 1985 pp. 4–13 and 4–14 (set File Mask).
IBM DOS Reference Manual, Feb. 1986 pp. 7-17 & 7-18 (DOS Attribute command).
IBM Data Processing Glossary 6th Ed. Oct. 1977, pp. 196, 238 and 239.

Primary Examiner—Robert L. Richardson
Assistant Examiner—Nabil Hindi
Attorney, Agent, or Firm—H. F. Somermeyer

[57] ABSTRACT

Rewriteable media, such as magnetooptic record members or disk has its recording controlled such that the recording is certifiable as meeting write once read many characteristics. Controls are introduced for the entire disk for indicating that the rewriteable disk is to be used for certified or vault writing, at least in some radial zones of the disk. Recording or writing operations are limited to those addresssable areas on the certifiable rewriteable medium that have not been previously written. Each of the addressable areas of the medium, in a disk termed, sectors, have a precursor portion called a control area which indicates the status of the sector and is used for preventing overwriting or erasure as well as controlling.

17 Claims, 3 Drawing Sheets

FIG. 1

FIRST TYPE OF SECTOR AREA

SECOND TYPE OF SECTOR AREA

FIRST TYPE OF CONTROL AREA

SECOND TYPE OF CONTROL AREA

CONTROLS FOR OPTICAL DISK RELATING TO ACCESSING AND UTILIZATION OF SUCH DISK

DOCUMENT INCORPORATED BY REFERENCE

Co-pending commonly assigned application Kulakowski et al., Ser. No. 07/577,250 filed Sep. 4, 1990, is incorporated as a part of the disclosure of the present invention.

FIELD OF THE INVENTION

The present invention relates to recording or writing and reading systems of the optical disks of device types, particularly to controlling a rewriteable disk in the manner for making it appear as a write once read many disk (WORM).

BACKGROUND OF THE INVENTION

Optical signal-storing or data-storing writeable disks have been used for the last several years. There are generally two classes of these signal storing disks. The first class is a so-called write once read many (WORM) which usually take the form of ablative recording. Some WORM disk use phase change recording. A second type of writeable disk is one that is rewriteable, that is, the data can be erased and the area just erased can be used to store other signals. Of course, magnetic storage disks have the same property and had been used for many years. In optical disk technology, presently the most favored rewriteable disk material includes a magnetooptic layer on the disk. Because of performance constraints in a recorder, magnetooptic (MO) disks are erased before they are written. Such pre-erasure is not absolutely required, however present device technology limits the selection from a practical view to the pre-erasure requirements in order to obtain high performance and high linear densities of recording. The type of signal detection for WORM and for the magnetooptic (hereinafter MO) disks is quite different in that different signal detection circuits are used and the laser controls result in differing laser intensities. A more important problem is that if a single recorder were to be used both for WORM and MO disks, then because of two types of disks the inventory of disks increases. Accordingly, it is desired to provide a certifiable recording using rewriteable media whether it be MO or other forms of rewriteable media. The term certifiable means that automatic-machine procedures are in place for certifying that the data written to the record member or optical disk has not been altered and rewritten, i.e., represents the original recording. Of course, WORM media provides this certification because of its write once characteristic. Therefore, it is desired that automatic machine controls and procedures be placed on a rewriteable record medium that effectively emulates the rewriteable medium to a WORM.

DISCUSSION OF THE PRIOR ART

Satoh, et al., U.S. Pat. No. 4,774,700 shows a method of demarking or indicating that a sector on a write once read many disk is defective. Such demarking inhibits any access to the demarked sector except for the purpose of sensing its demarked status. Such demarking of a defective sector is indicated by a series of tones recorded in the sector.

German Patent Maeda, et al., 3,620,301 shows an optical disk media having a signal storing track intermediate radially adjacent guide grooves. The guide grooves are periodically circumferentially interrupted such that a flat surface area extends radially of the disk at each such interrupted area. This patent shows a track following indicator 5 for assisting in maintaining the alignment of an optical beam following the record track. Indicator 5 also serves as a tracking off-set indicator.

Optical disk media have been the subject of standardization activities over the past several years. The American National Standard Institute (ANSI) has reviewed and currently has several proposed standards relating to use of optical media. The International Standards Organization (ISO) as well as the Japanese Standards Association are also coordinating the standardization procedure. Document ISO/TEC JTC 1/SC23N292 dated Oct. 25, 1989 shows a format of an optical disk which includes an off-set detection flag as a circumferentially interruption of tracks on an optical medium. In such interrupted area, an off-set detection flag (ODF) is provided plus a flag field the content and meaning of which is not specified followed by an unrecorded area for testing laser power levels.

SUMMARY OF THE INVENTION

It is an object of the present invention to provide rewriteable signal storing media which emulates write once read many (WORM) media.

A rewriteable record member which uses the present invention includes first machine sensible indicia in a first predetermined one of a plurality of addressable signal storing areas for indicating that the rewriteable record member contains signals that are not to be changed from any original recording of such signals. Such contained signals are recorded in such a manner that they could be replaced by other signals absent controls of the present invention. In applying the invention to current optical disks, such first machine sensible indicia would be in a phase encoded portion (PEP) which is readable for identifying the type of disk. The rewriteable record member further has second machine sensible indicia for indicating whether or not the record member has been erased in its entirety. Third machine sensible indicia are recorded in non-signal storing areas which extend radially of the disk respectively between adjacent signal storing areas or sectors and indicate whether or not a respective one of the signal storing areas adjacent to the indication, respectively, can be erased or written.

The invention also includes methods and apparatus for utilizing a rewriteable medium for emulating the rewriteable medium to a WORM. Such methods and apparatus include formatting controls for rejecting format operations when the record medium has been formatted once, controlling the writing or recording operations such that previously written sectors cannot be rewritten or erased, and a defect control which detects that a written sector has predetermined errors. Signals stored in a sector with such predetermined areas is rerecorded on the record medium in a second of said signal storing areas together with an indication that such signals have been recorded in two of the signal storing areas.

The present invention also includes that a portion of the rewriteable medium can be used for rewriting data which a second portion of the rewriteable medium is emulated to a WORM operation.

The foregoing and other objects, features and advantages of the invention will be apparent from the following more particular description of preferred embodiments of the invention, as illustrated in the accompanying drawings.

DETAILED DESCRIPTION

Referring now more particularly to the appended drawings, like numerals indicate like parts and structural features in the various figures. A magnetooptic disk 10 has a spiral track 11 (FIG. 1) on each of its recording surfaces (not separately shown). Spiral track 11 can be divided into a plurality of radial zones as later described, in each zone the spiral track 11 has a plurality of substantially circular track portions or circumvolutions, i.e., one circumferential extent from a reference point on the disk 10 and extending circumferentially around one circuit of the disk. For guiding an optical beam along the longitudinal or circumferential extent of track 11, guide grooves 13 (FIG. 1) are disposed on radially opposite sides of the track 11. Each longitudinal portion of track 11 contiguous with the guide grooves 13 is termed sector area 12. Each sector area 12 is a signal storing area of disk 10 having any one of the possible plurality of signal storing formats, as will be later described. Extending radially of disk 10 between the longitudinal ends of the guide grooves 13 are mirror mark 14, each of which includes a control area portion 15 of track 11. The term non-signal storing means that user data are not stored in area 15; rather area 15 is used solely for control purposes as will become apparent. Mirror mark 14 merely is a continuous first surface on the recording surface of the disk 10 uninterrupted radially by any of the guide grooves 13.

Figure 2:
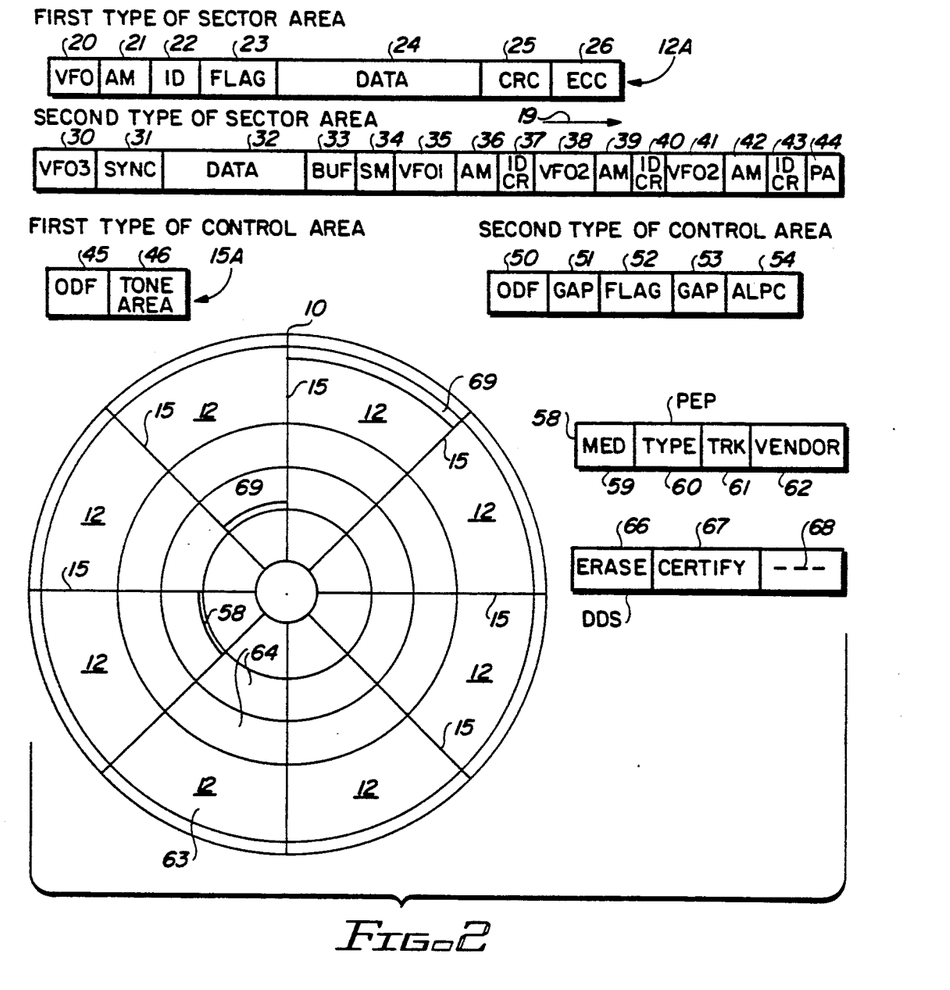
FIG. 2 illustrates various formats for the rewriteable record member of FIG. 1.

Referring next to FIG. 2, a simplified discussion of formats on disk 10 are described; two formats for sector area 12 are described and two different formats for control area 15 are described. A first format 12A for sector area 12 which is scanned in the direction of arrow 19 begins with a clock synchronizing field VFO 20 (VFO means variable frequency oscillator) which has a signal format for synchronizing a clock usually implemented as a phase-lock loop (PLL). The next field is address mark AM 21 which identifies the framing of recorded code frame such as 2,7 (d,k) coded data frame or symbol. ID field 22 contains the circumvolution or track address, the logical sector address, i.e., identification of the number of sector area 12, and other information as may be desired. Flag field 23 indicates the status of the logical sector and the sector area 12. Data area 24 stores the user data, usually 512 or 1,024 bytes of data, plus resynchronization and other control signals beyond the present description. CRC field 25 and ECC field 26 contain the usual error detecting and correcting redundancies for the entire sector. This format is a compact format for enabling a greater amount of data to be stored in a sector area 12 than used in other formats. The fields 20–23 are recorded when the disk 10 is first formatted.

Figure 1:
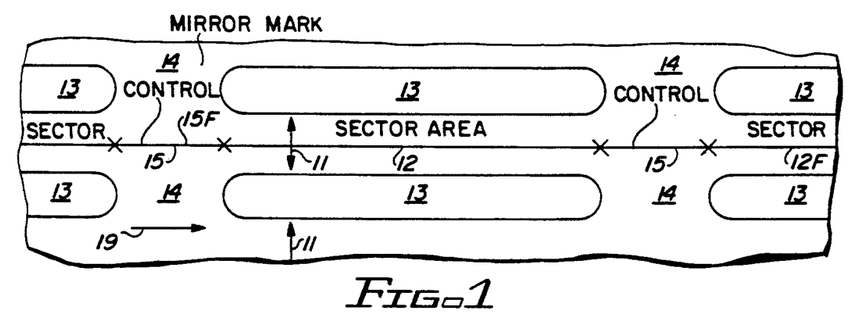
FIG. 1 is a diagrammatic plan view of a portion of an optical disk which contains and is used for the practice of the present invention.

Sector area 12B format is one that satisfies the requirements of a proposed standard by ISO (International Standards Organization) and ANSI (American National Standards Institute). In this format, each logical sector is split between two sector areas 12. Field SM (sector mark) 34 denotes the beginning of a new logical sector which is within the sector area 12. The description continues at the beginning of a sector area 12. A VFO3 field 30 has a signal format for synchronizing PLL. SYNC field 31 contains framing signals for identifying boundaries of 2,7 (d,k) code symbols. Following data field 32 is BUF field 103 which is an unrecorded buffer area for accommodating disk 10 rotational speed variations from one device or recorder to another device or recorder. As stated above, SM field 34 signifies the end of a leading logical sector as represented by numerals 30–33 and the on-set of a new logical sector, all within sector area 12. The following sector begins with VFO1 field 35, and extends into the trailing or following sector area 12 such as 12 F (FIG. 1). VFO1 field 35 is a first type of clock synchronizing field having a first pattern different from the patterns in field VFO2 and VFO3. Address mark 36 indicates the on-set of a control field. ID CR 37 is a field which contains a first of three copies of the sector and track address information with its own independent CRC redundancy for detecting errors in the ID portion of field 37. VFO2 field 38 is another clock synchronizing set of signals followed by an address mark 39 which indicates a second of the control fields in this format. ID CR field 40 is a repetition of field 38 as a second copy of the sector address. VFO2 field 41 repeats the pattern in VFO2 field 38. Address mark field AM 42 has a repetition of fields 36 and 39 and signifies the on-set of standing ID CR field 43, the third copy of the sector address information ID. PA field 44 is a postample to the control portion of a logical sector and terminates the sector area 12 for accommodating code frame boundaries and for closing the last CRC byte in field 43 at a boundary of a run length limited (RLL) 2,7 (d,k) digital modulation code.

A first type of control area 15 is represented by numeral 15A which includes off-set detection flag (ODF) field 45 which is used in the prior art. A tone or signal recording area 46 shares the mirror mark area 14 with ODF 45. The contents of tone area 46 is used in one embodiment of the present invention. Two tones of different frequency may be reached in field or area 46. A first tone indicates the ensuing sector is defective and cannot receive and store data. A second tone, having a frequency different from the frequency used in the first tone, indicates that data has been recorded in the ensuing sector.

A second type of control area 15B also begins with an ODF field 50 which is followed by a gap 51. A single byte flag field 52 is used for control information and in one of the illustrated embodiments of the present invention is used for controlling a writeable medium for certifying its recording or for emulating a writeable medium to the characteristics of a WORM medium. Gap 53 follows flag field 52 which in turn is followed by ALPC field 54. ALPC field 74 is for measuring the light intensity of a laser beam scanning track 11. This field in the prior art is used to control the recording or writing laser beam intensity. Flag field 52 is used in WORM media and is not used in the prior art for writeable media; the present invention uses this field for obtaining certified recording and other purposes, as will become apparent.

In addition to the above described sector related controls and formats, disk 10 includes disk oriented controls and formats which are pertinent to the practice of the present invention. Phase encoded portion PEP 58 is found at the inner radial position of disk 10 and is used for indicating the characteristics of the disk 10. PEP 58 is embossed or otherwise non-erasably written on disk 10 at time of manufacture for indicating the format and a recording characteristics of the signals on disk 10. System formatted portions (SPF) 69 replicate the PEP 58 information, plus other system information, at both an inner and outer radial position. PEP 58 can be read and scanned by any device without track following, i.e., the radial dimension of PEP 58 is greater than that of track 11. PEP 58 has several fields (the fields are defined in the ANSI standard) including media field MED 59 which defines the type of modulation used for recording signals, track following servo recording methods, interleave of the sectors for rotational efficiency, sectors per track, nominal baseline reflectance, signal amplitude and polarity for the prewritten or preformatted data such as written at time of manufacture, signal amplitude and polarity for user recorded data, maximum read power and other operational characteristics. Type field 60 indicates the type of media record disk 10 consists of. In the past, encoding included a separate identification for read only (ROM) disk in which all of the information was embossed on the disk, a write once read many (WORM) medium, a rewriteable or magnetooptic (MO) media of the type being discussed in the illustrated embodiment of this disclosure, an erasable or phase change medium. In addition to the above, either the write once, the rewriteable or the erasable can be combined with the partial ROM medium, i.e., two types of recording are on the disk. In accordance with the present invention, additional media type indications are added to type field 60 for indicating different types of disks. A first type is called vault1.

The vault1 type indicates that the entire disk 10 is a rewriteable medium and is to be used for certified recording such as that recording on rewriteable media that emulates WORM characteristics. A second type, called vault2, indicates a disk in which part of the disk is such rewriteable media to contain certified recording for emulating WORM characteristics and that other portions of the disk 10 can employ other forms of recording as mentioned above. For example, it can include a ROM portion or a portion of the disk can be designated as rewriteable, but not necessarily emulated to WORM characteristics. It can be seen from this statement that the invention can be applied to various configurations of record media. For example, when a portion of disk 10 contains ROM recording, then the certified rewriteable portion can be used for storing data in the ROM portion but has a marginal readback quality. Recording such ROM stored data using certified recording monitors readback signal quality while certifying that the digital recorded information is being maintained. Such certification will maintain the integrity of the ROM data. Other applications and configurations can be readily envisioned within the scope of practicing the present invention. For example, the portions of the disk could be radial zones of different types of recording or can be radial zones of the same types of recording. For example, an outer zone 63 of disk 10 may be a radial zone having a rewriteable magnetooptic layer which is to have certified recording for emulating WORM characteristics. Inner zone 64 may also be rewriteable magnetooptic recording areas which do not emulate WORM characteristics, i.e., are used as in today's magnetooptic disk. Other forms of recording may also be employed in zone 64. Of course, all three zones 63, 64 can be used for certified recording depending upon the code placed in type field 60 of PEP 58.

All optical disks as well as magnetic disks contain some form of data directory which is an addressing structure for accessing the various sector areas 12 on disk 10. In many optical disks, such a directory is termed data definition structure (DDS) 65. Field 68 indicates that directory structure which may include a defect list of a primary and secondary type, as is known, as well as addressing data. In accordance with the invention, two additional fields 66 and 67 are added to DDS 65. Field 66 indicates whether or not the disk 10 has been erased in its entirety or that all nonwritten sectors areas 12 had been erased in their entirety. Field 67 indicates whether or not the recording surface of disk 10 has been examined and certified as to defect locations and defect free sector areas 12. Such certification is indicated in the DDS 65 defect list (not shown in field 68). The contents of fields 66 and 67 are control information usable in the practice of the present invention for ensuring against intended or unintended erasure of certified recording requirements.

Most small disks of the removeable media type come encased in a cartridge having a moveable shutter which is automatically opened upon insertion of the cartridge into a disk player/recorder. Such cartridges have been used for encasing magnetic disk of both the 5.25 inch and 3.5 inch diameter types. Machine sensible holes or protrusions have been used in such magnetic media cartridges for externally indicating the characteristics of the contained disk medium. For example, in the 3.5 inch magnetic media an absence of a hole indicates a one megabyte unformatted magnetic disk where a hole in the cartridge indicates a two megabyte unformatted magnetic disk, i.e., a higher quality disk. Such holes and absence of holes have been used for years providing write protect and for indicating various and sundry characteristics of the contained media as well as for orienting the cartridge properly in the cartridge receiving mechanism of a player/recorder. Such externally sensible indicia enables the examination of the outer portion of the cartridge without having to read the contained medium and without reading PEP 58. The cartridge is used in connection with practicing the present invention to indicate that the contained record medium is a write once emulated erasable or rewriteable record medium. In one embodiment four hole positions are used to indicate the cartridge contents. The hole position when closed represent no indicator active while when open represent the hole position indicator is active. The holes are arbitrarily numbered one through four and have been used in the prior art. One goal of the present invention is to ensure that prior art drives will not inadvertently override the certification of the recording. In the prior art, hole position number 2 when open indicates that no recording surface is facing the drive transducer, i.e. for single sided disks this means the cartridge is inserted upside down. In a practice of the present invention, hole position number 2 is opened to preclude prior art drives from accessing the contained disk on either side of the disk. Hole position number 4, for example, is opened for indicating the contained disk is to be used for certified recording. Other hole positions may be used for indicating variations in practicing the present invention. Cartridge intrusion detection indicators may also be used for indicating whether or not the cartridge has been disassembled which, of course, reduces the certification level of the recording on the contained record medium.

Optical disk recorders employed for operating with rewriteable media contain command responsive apparatus and programming for removing recorded information from such media and replacing it with other updated information. For providing certified recording, controls are introduced into an optical disk or other recorder for ensuring against such erasure of originally recorded information and replacement with new information. The usual erase function in its broad sense is inhibited for preventing erasing data of a sector area 12 that has been written to. That is, once signals are recorded in a sector area 12, it no longer can be erased nor written to. The recording or writing commands are controlled as shown in the machine operations chart of FIG. 4. Format-disk commands are restricted and controlled for preventing removing data from a written-to sector 12. A simplified machine operations chart for effecting this control is shown in FIG. 5. Reassigning data from one sector area 12 to another sector area is controlled to prevent contents of a sector written in a certified or vault writing mode from being effectively erased. Defect management will provide for reassignment of data from one sector to another while maintaining the data in the original sector. DDS 65 is updated to reflect that the data is recorded in both sectors but that the second or subsequent sector has a more readable copy of the data. This control is described in a simplified machine operations chart of FIG. 6.

Figure 3:
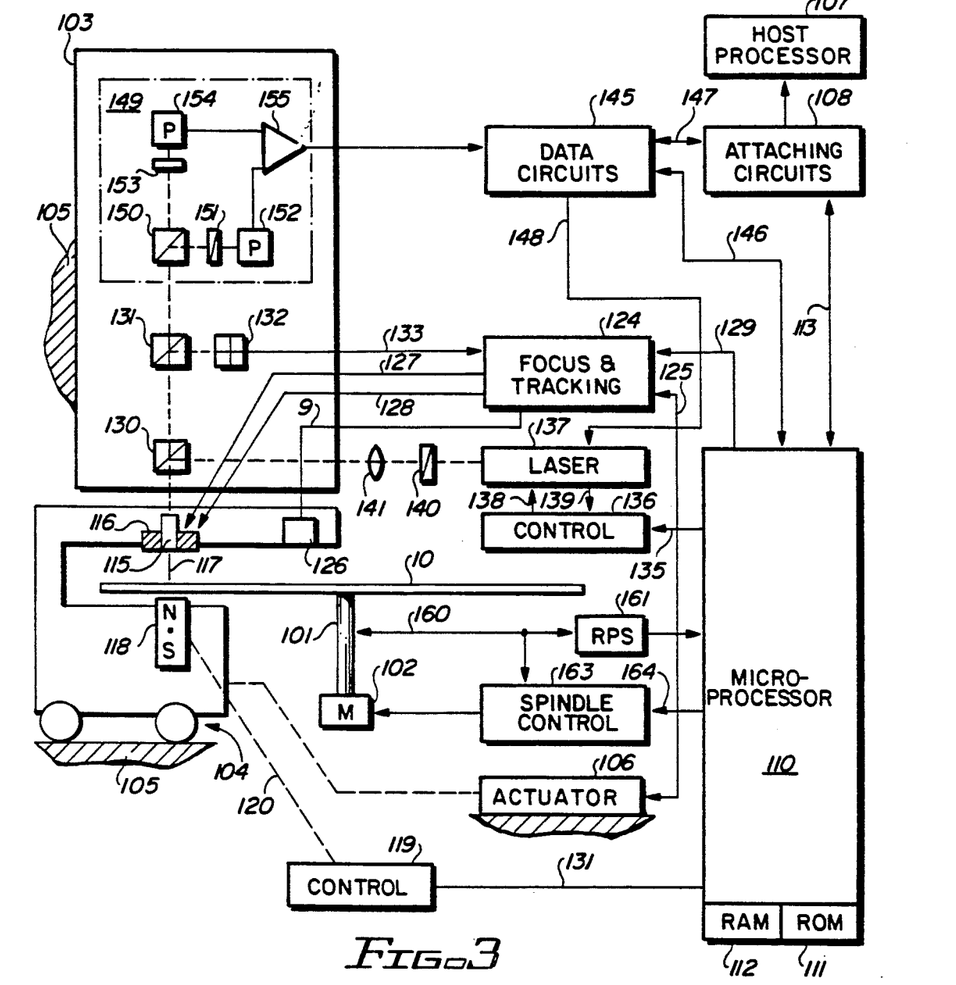
FIG. 3 illustrates, in simplified block diagram form, an optical disk recorder capable of using the FIG. 1 illustrated record member and in which the present invention may be advantageously employed.

Before going into the details of how the procedures and criteria are effected in accordance with the present invention, the environment in which the present invention is advantageously practiced is shown in FIG. 3. A magnetooptic record disk 10 is mounted for rotation on spindle 101 by motor 102. Optical elements 103 on a frame 105 is optically coupled to objective lens 115 on headarm carriage generally denoted by numeral 104 moves radially of disk 10. The frame 105 of recorder suitably mounts carriage 104 for reciprocating radial motions. The radial motions of carriage 104 enable access to any one of a plurality of concentric tracks or circumventions of a spiral track for recording and recovering data on and from the disk 10. The optically coupling is a light path extending from beam splitter 130 to a mirror (not shown) on carriage 104 thence axially of disk 10 to lens 115. Linear actuator 106 suitably mounted on frame 105, radially moves carriage 104 for enabling track accessing. The recorder is suitably attached to one or more host processors 107, such host processors may be control units, personal computers, large system computers, communication systems, image signal processors, and the like. Attaching circuits 108 provide the logical and electrical connections between the optical recorder and the attaching host processors 107.

Microprocessor 110 controls the recorder including the attachment to the host processor 107. Control data, status data, commands and the like are exchanged between attaching circuits 108 and microprocessor 110 via bidirectional bus 113. Included in microprocessor 110 is a program or microcode-storing, read-only memory (ROM) 111 and a data and control signal storing random-access memory (RAM) 112.

The optics of the recorder include an objective or focusing lens 115 mounted for focusing and radial tracking motions on headarm 103 by fine actuator 116. This actuator includes mechanisms for moving lens 115 toward and away from disk 10 for focusing and for radial movements parallel to carriage 104 motions; for example, for changing tracks within a range of 100 tracks so that carriage 104 need not be actuated each time a track adjacent to a track currently being accessed is to be accessed. Numeral 117 denotes a two-way light path between lens 115 and disk 10.

In magnetooptic recording, magnet 118 in a constructed embodiment (magnet 118 is an electromagnet) provides a weak magnetic steering field for directing the remnant magnetization direction of a small spot on disk 10 illuminated by laser light from lens 115. The laser light spot heats the illuminated spot on the record disk to a temperature above the Curie point of the magnetooptic layer (not shown, but can be an alloy of rare earth and transitional metals as taught by Chaudhari et al., U.S. Pat. No. 3,949,387). This heating enables magnet 118 to direct the remnant magnetization to a desired direction of magnetization as the spot cools below the Curie point temperature. Magnet 118 is shown as oriented in the "write" direction, i.e., binary ones recorded on disk 10 normally are "north pole remnant magnetization". To erase disk 10, magnet 118 rotates so the south pole is adjacent disk 10. Magnet 118 control 119, which is operatively coupled to rotatable magnet 118 as indicated by dashed line 120, controls the write and erase directions. Microprocessor 110 supplies control signals over line 71 to control 119 for effecting reversal of the recording direction.

It is necessary to control the radial position of the beam following path 117 such that a track or circumvolution is faithfully followed and that a desired track or circumvolution is quickly and precisely accessed. To this end, focus and tracking circuits 124 control both the coarse actuator 106 and fine actuator 116. The positioning of carriage 104 by actuator 106 is precisely controlled by control signals supplied by circuits 124 over line 125 to actuator 106. Additionally, the fine actuator 116 control by circuits 124 is exercised through control signals travelling to fine actuator 116 over lines 127 and 128, respectively for effecting respective focus and track following and seeking actions. Sensor 126 senses the relative position of fine actuator 116 to headarm carriage 103 to create a relative position error (RPE) signal. Line 127 consists of two signal conductors, one conductor for carrying a focus error signal to circuits 124 and a second conductor for carrying a focus control signal from circuits 124 to the focus mechanisms in fine actuator 116.

The focus and tracking position sensing is achieved by analyzing laser light reflected from disk 10 over path 117, thence through lens 115, through one-half mirror 130 and to be reflected by half-mirror 131 to a so-called "quad detector" 132. Quad detector 132 has four independent photoelements which respectively supply signals on four lines collectively denominated by numeral 133 to focus and tracking circuits 124. Aligning one axis of the detector 132 with a track center line, track following operations are enabled. Focusing operations are achieved by comparing the light intensities detected by the four photoelements in the quad detector 132. Focus and tracking circuits 124 analyze the signals on lines 63 to control both focus and tracking.

Recording or writing data onto disk 10 is next described. It is assumed that magnet 118 is rotated to the desired position for recording data. Microprocessor 110 supplies a control signal over line 135 to laser control 136 for indicating that a recording operation is to ensue. This means that laser 137 is energized by control 136 to emit a high-intensity laser light beam for recording; in contrast, for reading, the laser 137 emitted laser light beam is a reduced intensity for not heating the laser illuminated spot on disk 10 above the Curie point. Control 136 supplies its control signal over line 138 to laser 137 and receives a feedback signal over line 139 indicating the laser 137 emitted light intensity. Control 138 adjusts the light intensity to the desired value. Laser 137, a semiconductor laser, such as a gallium-arsenide diode laser, can be modulated by data signals so the emitted light beam represents the data to be recorded by intensity modulation. In this regard, data circuits 145 (later described) supply data indicating signals over line 148 to laser 137 for effecting such modulation. This modulated light beam passes through polarizer 140 (linearly polarizing the beam), thence through collimating lens 141 toward half mirror 130 for being reflected toward disk 10 through lens 115. Data circuits 145 are prepared for recording by the microprocessor 110 supplying suitable control signals over line 146. Microprocessor 110 in preparing circuits 145 is responding to commands for recording received from a host processor 107 via attaching circuits 108. Once data circuits 145 are prepared, data is transferred directly between host processor 107 and data circuits 145 through attaching circuits 108. Data circuits 145, also ancillary circuits (not shown), relating to disk 10 format signals, error detection and correction and the like. Circuits 145, during a read or recovery action, strip the ancillary signals from the readback signals before supply corrected data signals over bus 147 to host processor 107 via attaching to 108.

Reading or recovering data from disk 10 for transmission to a host processor requires optical and electrical processing of the laser light beam from the disk 10. That portion of the reflected light (which has its linear polarization from polarizer 140 rotated by disk 10 recording using the Kerr effect) travels along the two-way light path 117, through lens 115 and half-mirrors 130 and 131 to the data detection portion 149 of the headarm 103 optics. Half-mirror or beam splitter 150 divides the reflected beam into two equal intensity beams both having the same reflected rotated linear polarization. The half-mirror 150 reflected light travels through a first polarizer 151 which is set to pass only that reflected light which was rotated when the remnant magnetization on disk 10 spot being accessed has a "north" or binary one indication. This passed light impinges on photocell 152 for supplying a suitable indicating signal to differential amplifier 155. When the reflected light was rotated by a "south" or erased pole direction remnant magnetization, then polarizer 81 passes no or very little light resulting in no active signal being supplied by photocell 152. The opposite operation occurs by polarizer 153 which passes only "south" rotated laser light beam to photocell 154. Photocell 154 supplies its signal indicating its received laser light to the second input of differential amplifier 155. The amplifier 155 supplies the resulting difference signal (data representing) to data circuits 145 for detection. The detected signals include not only data that is recorded but also all of the so-called ancillary signals as well. The term "data" as used herein is intended to include any and all information-bearing signals, preferably of the digital or discrete value type.

The rotational position and rotational speed of spindle 101 is sensed by a suitable tachometer or emitter sensor 160. Sensor 160, preferably of the optical-sensing type that senses dark and light spots on a tachometer wheel (not shown) of spindle 101, supplies the "tach" signals (digital signals) to RPS circuit 161 which detects the rotational position of spindle 101 and supplies rotational information-bearing signals to microprocessor 110. Microprocessor 110 employs such rotational signals for controlling access to data storing segments on disk 10 as is widely practiced in the magnetic data storing disks. Additionally, the sensor 90 signals also travel to spindle speed control circuits 93

Figure 4:
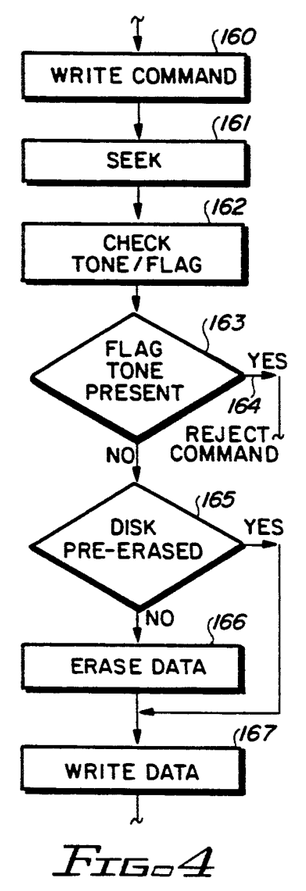
FIG. 4 is a simplified machine-operations chart showing the control of a recording or write command executed in the FIG. 3 illustrated recorder.
Figure 5:
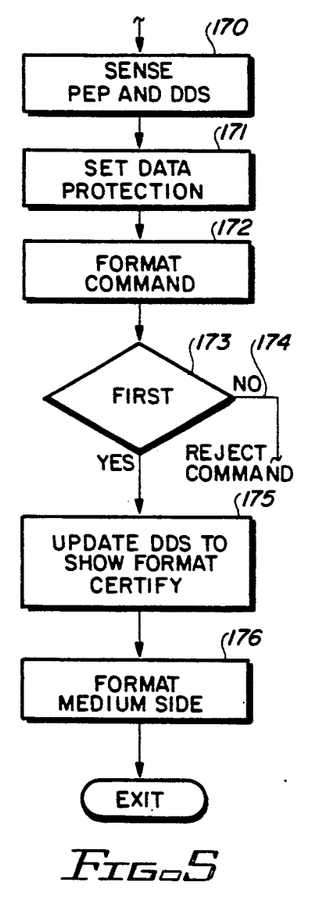
FIG. 5 is a simplified machine-operations chart setting up a data protection control using the format of FIG. 2 in the optical disk recorder of FIG. 3 which limits the formatting of the record member.

A write operation for certified recording is described by referring next to FIG. 4. This description assumes that PEP 58 and DDS 65 have been sensed as later described for indicating the operation on the record member or disk 10 is of the certified or vault type. During a write operation as to a WORM disk (certified recording is the same as writing to a WORM disk) a write command is received at machine step 160. At machine step 161 there is a seek to the appropriate sector area 12. At machine step 162 the control area 15 immediately upstream or proceeding the sector area 12 being addressed is sensed and examined. In the first type of control area 15A, tone area 46 is sensed for determining whether or not a tone has been recorded. If no tone is recorded, then the immediately ensuing sector area 12 can be written. If a second tone has been recorded in tone area or field 46, then no write operation nor erase operation is permitted in the indicated or ensuing sector area 12.

Remember that a first tone in field 46 signifies that the ensuing sector is defective. The tone can also indicate a defect in the sector area 12 such as found during certification of disk 10 or during readback or writing operations, as is known. In an alternate arrangement, the control area 15 may be separated from a sector area 12 by one sector area 12 and control area 15 for allowing time for analyzing and controlling the certification function, that is, as seen in FIG. 1. Control area 15F may contain the certification controls for sector 12F; of course, the control area 15F should always proceed in scanning the controlled or indicated sector area 12.

Figure 7:
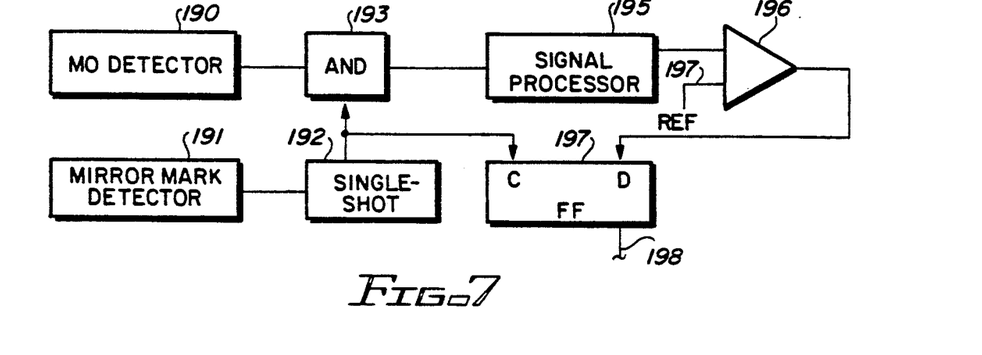
FIG. 7 is a simplified block diagram of circuits for processing the signals in a so-called mirror area of the disk shown in FIG. 1.

Depending upon whether the disk 10 is hard sectored, i.e., the IDs are embossed into the disk, or the disk 10 is soft sectored, i.e., the IDs are recorded on the disk, use of tone area or tone area field 46 may be changed. That is, absence of a tone may indicate that the indicated sector area has not been certified and may be defective. Presence of a first tone will indicate that the sector area 12 has been erased and is ready for writing while a second frequency tone will indicate the sector 12 is written to and is to be write protected against overwriting and erasing. The first frequency tone may be a high frequency tone such as a monotonous series of 1s while the second tone may be a lower frequency as a monotonous series of 100 wherein 1 is a transition of magnetic flux in the magnetooptic medium. Other forms of tone may be used for indicating various sector 12 conditions for controlling the certification of the original recording in sector area 12. The detection of mirror mark area 14 and the electronics for scanning same is described later with respect to FIG. 7.

When the second type of and preferred control area 15B is used, such as compatible with WORM formatted disk, then the signal contents of flag field 52 are sensed for determining the status of the indicated sector area 12. In this regard, flag field 52 is subject to controls against rewriting, i.e., can only be written once and not erased. In the writing process for first writing to the data area 24 or 32, when the flag field 52 is unwritten, then writing can proceed. For writing the data, the flag field 52 is written by a series of 1's using the 2,7 (d,k) code mentioned above. At step 162, the device examines the flag field 52. If at step 163 the all 1's pattern of field 52 was detected, the write command is rejected and machine operations proceed over path 164 for communicating the command rejection to host processor 107 thereby detecting recorded data as write once data and indicating to the requesting host processor 107 that an attempt was made to alter originally recorded data. Host processor 107 logs the exception and rejection of the write command for further analysis by personnel involved in ensuring proper certification of the disk 10 recording. Without the tone of all 1's in field 52, at machine step 165 the FIG. 3 illustrated microprocessor 110 examines DDS 65 to determine whether or not the disk 10 has been erased by examining fields 66 and 67. If the disk was not erased, then the data area 24 or 32 has to be erased first which is achieved at machine step 166. Note that the erasure of the data field 24 or 32 occurs without recording the all 1's pattern in flag field 72. The erase data step 166 requires that a rotation of disk 10 for again accessing the control area 15B and sector area 12 for writing the data at machine step 167. A first portion of machine step 167 records all 1's in flag field 72 and then subsequently records the data in data field 32 which completes the operation of recording data originally in a certifiable manner. Of course, microprocessor 110 supplies ending status to host processor 107 in a usual manner.

Figure 6:
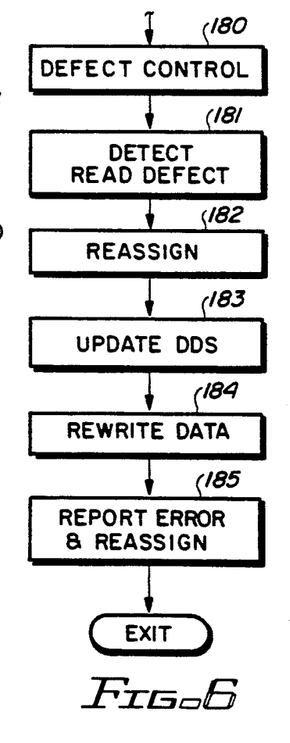
FIG. 6 is a simplified machine-operations chart showing a defect control for recording data read from a given signal storing area of the FIG. 1 illustrated record member to be rewritten to another area of the record member.

Referring next to FIG. 5, the setting of data protection and formatting of disk 10 is described. A first machine operation after receiving disk 10 for operations by the FIG. 3 illustrated recorder, PEP 58 and DDS 65 are sensed in machine step 170. This sensing informs the FIG. 3 illustrated recorder that all of recording and operations are to ensure certified recording meeting WORM characteristics. Then at machine step 171, the data protection flags are set for ensuring the operations shown in FIGS. 4-6 are complied with for preserving the certification of the recording. A format disk command is received at machine step 172. At machine step 173, microprocessor 110 examines DDS fields 66 and 67 for determining whether or not the format command is a first one received for the present disk 10. If fields 66 and 67 indicate a previous format, such as erasure and certification, then the format command is rejected with status being sent to host processor 107 indicating an attempted format on a previously formatted disk. The sensing of step 173 also includes sensing DDS 65 for any data that may have been recorded using the FIG. 4 illustrated machine operations. Two procedures can be used here. The format command can be rejected for the reason that even though it is the first format command received, data has been recorded and therefore the disk 10 should not be formatted. For certified recording, disk 10 can only be formatted once. Such formatting is for initializing disk 10. If at machine step 173, it is the first received format command, then at machine step 175, DDS 65 is updated by recording certification in field 67. Then at machine step 176 the disk is formatted as described above. At completion of machine step 176 the erasure field 66 is set to an active state for indicating completion of the one and only format operation for disk 10.

When fields 34 through 44 are prewritten by embossing, then only the data field 102, BUF field 103 and fields 30, 31 are erased. For format 12A fields 20-22 are not embossed with the rest of the sector area for fields 23-26 being eraseable.

In a soft sectored disk 10, during a format operation the fields mentioned above that were embossed for hard sectoring are written and the fields referred to above that were erased are erased. The erasure and certification can be by a single pass wherein the reflection of light from the disk 10 during erasure is sensed for identifying defects in the areas being erased. Therefore, a first pass of each track includes erasing the entirety of the track including the control areas 15. During the erasure steps, microprocessor 110 notes which of the sector areas 12 have sufficient defects for preventing effective data or signal storage therein. The just erased track is then formatted using known soft sectoring techniques. Upon completion of writing the erased track, the beam is moved to a radially adjacent track for erasing. The track is then erased after reversing the magnet 118 field to the erasure direction. Upon completion of the verifying, then a third track is accessed for erasing and the steps above described are repeated for a minimal time soft sectoring operation.

The defect management for a certified recording disk 10 is briefly shown in FIG. 6. The defect management is based in large part upon the defect management set forth in co-pending commonly assigned application for patent, supra. The defect control at machine step 180 indicates that defect monitoring includes all of the functions described in said co-pending application for detecting a defect on recording, the procedure set forth in the co-pending application are followed and data is reassigned to another sector area 12 and the unsuccessful recording results in the originally intended sector area 12 being marked as defective. The co-pending application also teaches reassigning data from an original sector to another sector upon detecting a read defect such as at machine step 181. The reassign procedures of step 182 follow that of the co-pending application except that in DDS 65 it is indicated that the original sector still has data and it is defective while the second sector area 12 which is to receive the data from the defective sector is also indicated in DDS 65 such as done at step 183. Then the data is actually rewritten at step 184 to the newly assigned sector. The error is recorded, as well as the reassignment at machine step 185 to host processor 107. In these regards, it should be noted that the information contained in DDS 65 can be certified in the same manner as other sectors which means that the number of sectors areas 12 used to store DDS 65 will grow as the data is recorded on disk 10. In this regard, the procedures set forth for WORM recording and management of disk space can do that as shown in Flannagan et al. of U.S. Pat. No. 4,827,462. The DDS 65 can be made rewriteable, i.e., the contents of such DDS is not certified. This allows the recording and updating of the secondary defect list which is recorded in area 68 of DDS 65 which contains a list of defective sector areas 12 discovered during the use and identification of alternate sectors assigned as replacement to be updated during the life of disk 10. Such an arrangement maintains compatibility with operation of rewriteable media. In any event, a defective sector detected during a read operation is not overwritten with a defective mark in the data area, rather, the flag field 52 all 1's pattern for indicating data written to the sector is maintained.

The mirror mark 14 is a circularly grooved disk radial-extending surface continuity with a length of several bytes allowing magnetooptically signals to be written on the land area without interferring between the track recorded information and the groove. The grooved disk surface continuity 14 is sensed by detector 191 (FIG. 7) and supplies a signal used as a timing mechanism for enabling the precise placement of the control information in the mirror mark as well as the signals for sector area 12. It is preferred that the depth of the grooves 13 be one half of the laser wavelength such as to appear as a low reflectivity area of the disk surface to the sensor 132 while the land area appears as a high reflectivity area, i.e., the control area 15. A leading edge of the mirror mark 14 generates a positive peak pulse which is detected by mirror mark detector 191. Detector 191 actuates a single shot circuit 192 (FIG. 7) (a digital counter); the trailing edge of the mirror mark, i.e., the on-set of the next groove 13 generates a negative peak pulse which resets single shot 192. Suitable noise rejection procedures are preferably used for not confusing a surface defect of disk 10 as the onset of a groove 13. Single shot 192 supplies an enabling signal to AND or conjunction circuit 193. MO detector 190, which is a part of data circuits 145, supplies its data to AND circuit 193 as well as to other areas. When AND circuit 193 is activated, then the MO detected signals are supplied to signal processor 195 for determining the content recorded in control area 15. Single shot 192 also supplies a signal to the C input of the flip flop 197. Signal processor 195 can detect a tone of predetermined frequency or other data indicia for activating comparator 196 to compare same with a reference value supplied over line 197. When a predetermined tone of area 46 or a all 1s pattern in flag field 52 are detected, then a signal is supplied by comparator 196 to the D input of flip flop 197. This action causes a signal to be supplied over line 198 which travels to microprocessor 110 as a certification indicating signal for preventing overwriting or overerasing such as detected in machine step 162 of FIG. 4.

While the invention has been particularly shown and described with reference to preferred embodiments thereof, it will be understood by those skilled in the art that various changes in form and details may be made therein without departing from the spirit and scope of the invention:

What is claimed is:

1. A rewriteable record member having a multiplicity of addressable signal storing areas and adapted to be scanned in a predetermined longitudinal direction, non-signal storing areas interposed between adjacent ones of the addressable signal storing areas along said longitudinal direction, the improvement including, in combination:

first machine-sensible indicia in a first predetermined one of said addressable signal storing areas indicating that the rewriteable record member contains signals that are not to be changed from any original recording of such signals;

second machine-sensible indicia in a second predetermined one of said addressable signal storing areas indicating whether or not the record member has been erased once in its entirety; and third machine-sensible indicia in each of said non-signal storing areas respectively indicating whether or not one of said adjacent ones of the data-storing ones of said adjacent addressable signal storing areas can be written to.

2. In the record member set forth in claim 1, further including, in combination:

a data definition structure, which includes said second machine-sensible indicia stored in said second predetermined one of said signal storing areas, said data definition structure including control signals stored in further predetermined ones of said addressable signal storing areas and said third machine-sensible indicia not being in non-signal storing areas respectively adjacent said further predetermined ones of said addressable signal storing means.

3. In the record member set forth in claim 1, further including, in combination:

said record member having optical storage properties;

said first indicia being pre-written, non-erasable and non-rewriteable and said second and third indicia being optically recorded as rewriteable stored signals.

4. In the record member set forth in claim 3 wherein said first indicia is embossed and each of said addressable signal storing areas including embossed address indicia indicating its address.

5. In the record member set forth in claim 3, further including, in combination:

said record member being an optical disk of the magnetooptic type having a plurality of substantially circular tracks, each of said addressable signal storing areas being a sector of a respective one of a plurality of substantially circular tracks of the disk and said longitudinal direction is a circumferential direction on the disk.

6. In the rewriteable record member set forth in claim 1 further including, in combination:

said record member having two radial zones each respectively having a first and second predetermined number of tracks;

said third machine-sensible indicia being only in a first of said two zones such that writing to addressable signal storing areas in a second of said zones is not inhibited.

7. In a machine-effected method of operating an optical device having an optical record member and optical means for supplying a light beam to and receive a light beam from the record member for writing signals thereon and reading recorded signals therefrom, the record medium having a multiplicity of addressable signal storing areas and adapted to be scanned in a predetermined longitudinal direction, non-signal storing areas interposed between adjacent ones of the addressable signal storing areas along said longitudinal direction including the machine-executed steps of:

indelibly writing first machine-sensible indicia in a first predetermined one of said addressable signal storing areas for indicating that the rewriteable record member contains signals that are not to be changed from any original recording of such signals;

after indelibly writing said first machine-sensible indicia, writing second machine-sensible indicia in a second predetermined one of said addressable signal storing areas for indicating whether or not given predetermined ones of the signal storing areas of the record member have been erased including if all of the record member has been formatted including erasure;

allowing only one erasure in each of the given signal storing areas; and after indelibly writing said first machine-sensible indicia and while not writing said second machine-sensible indicia, writing third machine-sensible indicia in each of said non-signal storing areas respectively adjacent each of said given signal storing areas for indicating whether or not said respective adjacent addressable signal storing area can be written to.

8. In the machine-effected method set forth in claim 7 further including the step of:

selecting an optical disk as said record member, said selected optical disk having said indelibly written first machine-sensible indicia; and not performing said step of indelibly writing first machine-sensible indicia.

9. In the machine-effected method set forth in claim 7 further including the machine-executed steps of:

selecting said record member to be an optical disk of the magnetooptic type having a plurality of substantially circular tracks, each of said addressable signal storing areas being a sector of a respective one of a plurality of substantially circular tracks of the disk and said longitudinal direction is a circumferential direction on the disk.

10. In the machine-effected method set forth in claim 8 further including the machine-executed steps of:

receiving signals to be written on the record member in an addressed predetermined one of said signal storing areas, said addressed signal storing area being a signal storing area other than said first and second predetermined ones of the signal storing areas;

machine sensing said first indicia for reading the first indicia indication that the rewriteable record member contains signals in said given predetermined ones of the signal storing areas that are not to be changed from any original recording of such signals;

machine sensing said second indicia for reading the second indicia indication for ascertaining whether or not the addressed predetermined one of said signal storing areas is an erased given one of said signal storing area; and responding to said machine sensing of said second indicia resulting in an indication that the addressed predetermined one of said signal storing areas is an erased signal storing area for machine sensing said third indicia adjacent said addressed predetermined one of said signal storing areas;

then, machine sensing whether or not the third indicia indicates no inhibition from writing the received signals into the addressed predetermined one of the signal storing areas;

in a writing step, responding to a sensed indication of no inhibition for writing the received signals into the addressed predetermined one of the signal storing areas;

after completing said writing step, changing the third indicia adjacent the addressed predetermined one of the signal storing areas to indicate that writing into said addressed predetermined one of the signal storing areas is inhibited; and if the machine-sensed second indicia indicated that the record member was not formatted, then before said writing step, erasing the addressed predetermined one of the signal storing areas.

11. In the machine-effected method set forth in claim 9 further including the machine-executed steps of:

sensing the second machine-sensible indicia in response to the sensed second machine-sensible indicia indicating that the record member has not been entirely formatted, then sensing for any signal writing on the record member;

in response to the sensing for written signals indicating no written signals on the record member, formatting, including erasing, the record member;

in response to sensing that signals are written on the record member in third predetermined ones of said signal storing areas and that the record member is not entirely formatted;

then, determining which of the signal storing areas are not storing signals; and then, erasing fourth predetermined ones of the signal storing areas which are not storing signals.

12. In the machine-effected method set forth in claim 9 further including the machine-executed steps of:

sensing signals written to a first addressed predetermined one of said signal storing areas;

detecting predetermined errors in said sensing of said signals written to the first addressed predetermined one of said signal storing areas;

writing the sensed signals in a second addressed predetermined one of said signal storing areas that is erased and is not storing any signal;

recording in the non-signal storing area of said second addressed predetermined one of said signal storing areas that writing to the second addressed predetermined one of said signal storing areas is inhibited; and writing indicia on the record member for indicating the signals still stored in the first addressed predetermined signal storing area have been written to and are stored in said second addressed predetermined one of the signal storing areas.

13. In the machine-effected method set forth in claim 7 further including the machine-executed steps of:

establishing two zones of said addressable signal storing areas in the record member; and writing said third machine-sensible indicia only in a first one of said zones.

14. In the machine-effected method set forth in claim 8 further including the machine-executed steps of:

reading signals stored in a first addressed one of said given addressable signal storing areas and detecting a predetermined error during such reading;

recording the signals read from said first addressed one of said given addressable signal storing areas in a second addressed one of said given addressable signal storing areas;

recording said third indicia in a one of the non-signal storing areas that is adjacent to said second addressed one of said given addressable signal storing areas; and establishing a directory structure in the record member which includes indicia showing said signals read from the first addressed one of said addressable given signal storing areas are stored in said first and second addressed ones of said given addressable signal storing areas.

15. In apparatus for operating a recorder with a rewriteable medium having addressable signal storing areas and being for emulating write-once recording characteristics, including, in combination:

a first write means that erases, writes and verifies writing to unerased ones of the signal storing areas;

a second write means that writes and verifies writing signals to erased ones of the signal storing areas of the medium;

format means for formatting the medium including erasing any areas of the medium being formatted including means for limiting the format means to one formatting operation per medium; and inhibit means connected to the format means and to said first and second write means for actuating the format means and the write means for effectively inhibiting erasure and overwriting of any signals written on the record medium.

16. In the apparatus set forth in claim 15 further including, in combination:

said rewriteable medium being an optical recording medium and optical means connected to said first and second write means and said format means and in optical communication with the rewriteable medium for writing signals in the signal storing areas and for sensing signals written in said signal storing areas; and means in the inhibit means for identifying predetermined ones of the signal storing areas of the record member in which overwriting of any signals written in said predetermined ones of the signal storing areas is not inhibited.

17. In the apparatus set forth in claim 16 further including, in combination:

means in the format means for limiting the number of format operations in any one of said signal storing areas to once.

* * * * *